April 5, 1960 J. C. MAY 2,931,971

MAGNETIC AMPLIFIER CONTROL DEVICE

Filed April 15, 1955 2 Sheets-Sheet 1

INVENTOR.
Joseph C. May
BY
Johnson and Kline
ATTORNEYS

April 5, 1960
J. C. MAY
2,931,971
MAGNETIC AMPLIFIER CONTROL DEVICE
Filed April 15, 1955
2 Sheets-Sheet 2

INVENTOR.
Joseph C. May
BY
Johnson and Kline
ATTORNEYS

United States Patent Office 2,931,971

Patented Apr. 5, 1960

2,931,971

MAGNETIC AMPLIFIER CONTROL DEVICE

Joseph C. May, Northford, Conn., assignor to The Superior Electric Co., Bristol, Conn., a corporation of Connecticut Application April 15, 1955, Serial No. 501,647

9 Claims. (Cl. 323—89)

This invention relates to magnetic amplifier controls, and more particularly to self-saturating magnetic amplifiers of the type providing an A.C. output.

In the usual type of magnetic amplifier with A.C. output there are provided saturable reactors having output coils serially connected to rectifiers in a closed circuit. The conductive directions of the rectifiers, as regards the closed circuit, are such as to permit large circulating currents to flow when E.M.F.'s which are induced in the output coils are additive in said directions. For oppositely induced E.M.F.'s the circulating currents are virtually nil, since the rectifiers oppose the flow of current.

The control coils of the reactors are so connected and arranged that changes in their energization can cause these additive E.M.F.'s in the output coils, and due to the presence of the rectifiers and the action explained above, increases in the current of the control windings may cause large circulating currents in the output coil circuit, while decreases in the current may give rise to only inappreciable circulating currents.

Due to this great difference in the circulating currents, the time constant of the circuit is affected, to the extent that the magnetic amplifier has an asymmetrical response. The response time of the circuit is much poorer when the control current is being decreased, as compared with the response time when the control current is being increased.

The above disadvantage and drawback of these prior magnetic amplifiers providing for A.C. output is obviated by the present invention, and an object of the invention is to provide an improved magnetic amplifier type of control having A.C. output, wherein the response time for increases of control current is not greatly different from the response time for decreases in the control current. That is to say, the control is so constituted that it has a symmetrical response characteristic.

Another object of the invention is to provide an improved magnetic amplifier control in accordance with the above, which may have a relatively rapid speed of response.

Still another object of the invention is to provide an improved magnetic amplifier control as above set forth, which is relatively simple in construction and economical to fabricate.

Other features and advantages will hereinafter appear.

Figures 1, 2:
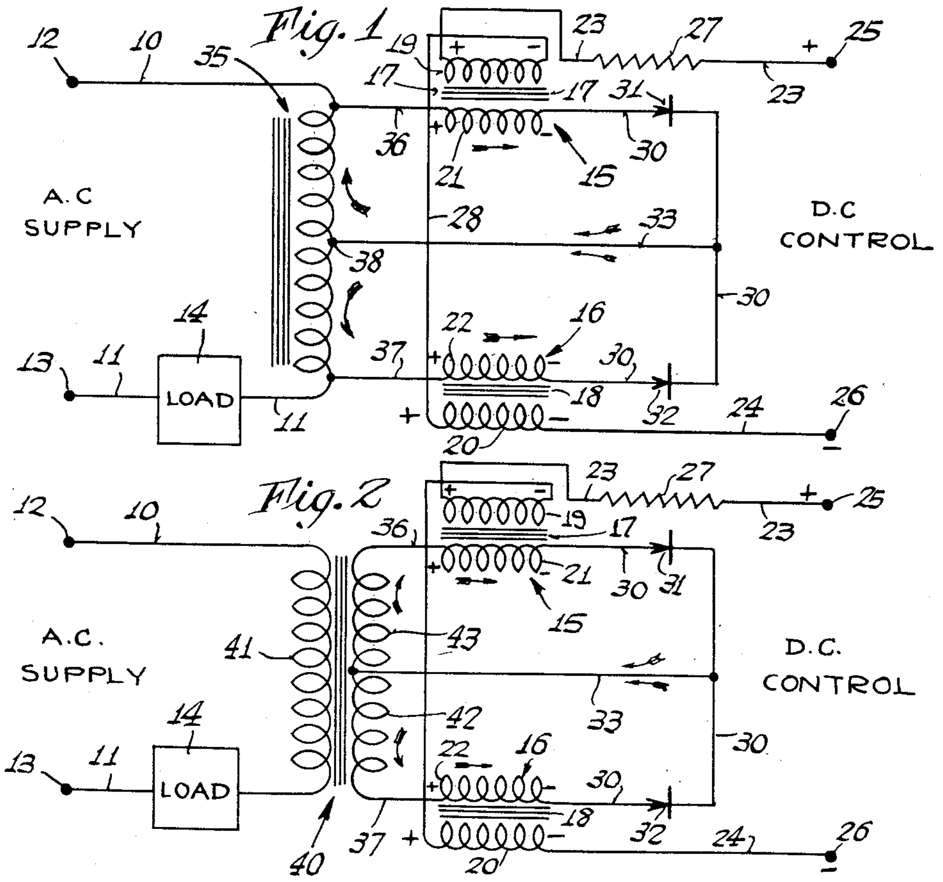
Figure 1 is a schematic diagram illustrating a magnetic amplifier made in accordance with the invention, said amplifier being adapted to control an A.C. load and being characterized by a symmetrical response for both increases and decreases of the load voltage.
Fig. 2 is a schematic diagram of a magnetic amplifier illustrating a modification of the invention.

Referring to Fig. 1 the magnetic amplifier shown therein comprises a supply circuit having leads 10 and 11 connected with terminals 12, 13, the lead 11 including an electrical load 14 which may, for example, be a bank of lamps or any other suitable piece of equipment adapted to be energized by A.C. The magnetic amplifier of Fig. 1 further comprises a pair of saturable reactor means 15, 16 having magnetic core structures 17, 18, output windings 19, 20, and control windings 21, 22, said windings being respectively disposed on the core structures 17 and 18, as indicated.

A control circuit is provided for the control windings 19, 20, said circuit comprising leads 23, 24 connected to terminals 25, 26 and to the control coils 19, 20 as shown. In the lead 23 a resistor 27 may be provided to reduce the time constant of the circuit. The control windings 19, 20 are connected to each other by a wire 28, and the various connections to the coils are such that they may have the polarities indicated.

The output windings 21, 22 are connected to each other by a wire 30, and interposed in said wire are rectifiers 31 and 32 arranged so that their conducting directions are opposite to each other. The output winding circuit also includes a common return wire 33 connected with the wire 30.

It will be understood that the rectifiers 31, 32 eliminate positive pulses from one of the output windings 21, 22 and negative pulses from the other of said windings when alternating current passes through the autotransformer 35.

I provide a coupling means connected with the supply leads 10, 11 and with the output winding circuits, said coupling means comprising in Fig. 1 an autotransformer 35 which can exercise a control over the current through the load 14 and which at the same time provides alternating potentials from the energy of the supply lines 10, 11 for application to the output winding circuits.

The autotransformer 35 is so arranged that it may change the impedance of the supply circuit 10, 11 in response to its being loaded by the reactors 15, 16. As shown, the end terminals of the autotransformer 35 are connected by wires 36 and 37 respectively to the output windings 21, 22 and the wire 33 of the output circuit is connected to a center tap 38 of the autotransformer.

I have found that, by virtue of the above arrangement, there is provided a readily-controlled A.C. energization of the load 14 which is characterized by a symmetrical response regardless of whether the load voltage is being increased or decreased.

Operation of the circuit of Fig. 1 is as follows: Assuming that a supply of alternating current is connected with the terminals 12, 13 the autotransformer 35 will be energized by current passing through the load 14, and on the presumption that the autotransformer 35 is unloaded, only the magnetizing current therefor will flow, representing a very small value which is insufficient to appreciably energize the load 14. In other words, virtually all of the A.C. voltage applied to the terminals 12, 13 will be absorbed by the autotransformer 35 and relatively little voltage will appear across the load 14, resulting in the load remaining substantially de-energized.

The output winding circuit of the reactors 15, 16 will be carrying relatively little current, assuming that the control windings 19, 20 are not energized from the D.C. control source and assuming that there is a proper bias (not shown), as is well understood in the art. The output winding 21 will carry half-wave rectified current, and the output winding 22 will also carry half-wave rectified current, thte energization of the winding 22 alternating with that of the winding 21 by virtue of the center-tap circuit and rectifier arrangement. Virtually all of the voltage evidenced by the upper half of the autotransformer 35 will be absorbed by the output winding 21, and virtually all of the voltage evidenced by the lower half of the autotransformer 35 will be absorbed by the output winding 22. No appreciable current will flow in the output winding circuits, only the magnetizing current for the reactors.

When it is desired to increase the energization of the load 14 the D.C. control voltage applied to the terminals 25, 26 is increased, causing the windings 19, 20 to produce a certain amount of flux in the cores 17, 18. As a consequence of this, saturation of the cores may occur during certain intervals, preventing the output windings 21, 22 from absorbing the entire output voltages of the autotransformer 35.

The latter will therefore be loaded, such loading occurring alternately between the upper and lower portions of the autotransformer at times which are determined by the frequency of the A.C. supply. Even though only one or the other half of the autotransformer 35 is loaded at any one time by the output winding circuits, it will cause an overall loading in the supply circuit 10, 11, causing less voltage to be absorbed by the autotransformer and causing more voltage to appear across the load 14. Thus a greater energization of the load will be obtained.

The D.C. control voltage applied to the terminals 25, 26 may be increased to the extent that the autotransformer 35 is fully loaded, causing virtually all of the A.C. supply voltage applied to the terminals 12, 13 to appear across the load 14, thus effecting maximum energization of the load.

When the D.C. control voltage is being decreased, E.M.F.'s are induced in the output coils 21, 22 as shown by the arrows, and these E.M.F.'s will cause circulating currents which pass through the rectifiers 31, 32 respectively and through the upper and lower halves of the autotransformer 35. Because of the presence of the autotransformer in the circuit carrying these circulating currents there is no virtual short-circuit condition which would give rise to excessive prolonged currents, as exists in prior magnetic amplifier circuits having A.C. output. Instead, the two portions of the autotransformer 35 function to appreciably limit the circulating currents to a relatively small value.

For the condition where the D.C. control voltage is being increased, the E.M.F.'s induced in the output windings 21, 22 will be opposite to the direction shown by the arrows, and will be limited by the opposition afforded by the rectifiers 31, 32. Thus, by the organization shown in Fig. 1 there is no path of very low impedance for the circulating currents as in the case of prior magnetic amplifiers having A.C. output, and no appreciably-large, circulating currents will be formed due to changes in the voltage of the D.C. control. Therefore the response time of the circuit will not be appreciably adversely affected but instead will be substantially symmetrical as regards increases or decreases of the control voltage.

In prior magnetic amplifiers having A.C. output, two output coils and two rectifiers are connected in a closed circuit in such a manner that the rectifiers have the same conductive directions, the result being that induced E.M.F.'s in the output coils can give rise to currents having a path of very low impedance for one specified direction; this can cause relatively high circulating currents. When in the circuit of Fig. 1 as provided by the present invention, the D.C. control voltage is increased, this does not happen and therefore the response time for an increase in the D.C. control voltage is virtually the same as for a corresponding decrease, providing for a symmetrical response characteristic.

It will be seen that I have accomplished the above symmetry of response by means of a magnetic amplifier circuit which is relatively simple and economical to produce while at the same time being reliable in its operation. As compared with a magnetic amplifier circuit providing a D.C. output, the present A.C. type circuit does not employ any additional components nor involve any added expense.

A modification of the invention is shown in Fig. 2, wherein a transformer with center-tapped secondary is employed in place of the autotransformer 35. Components of the circuit of Fig. 2 which are similar to those shown and described in Fig. 1 have been given like characters. In Fig. 2 a transformer 40 is provided, having a primary 41 connected with the supply leads 10, 11 and having a secondary 42 connected with the wires 36 and 37. The secondary 42 has a center tap 43 which is connected to the wire 33 of the output winding circuits.

Operation of the circuit of Fig. 2 is substantially similar to that described above in connection with Fig. 1. It will be noted that in Fig. 2 the supply circuit 10, 11 and load 14 are isolated from and not conductively connected to the circuit of the reactors 15, 16.

Figure 3:
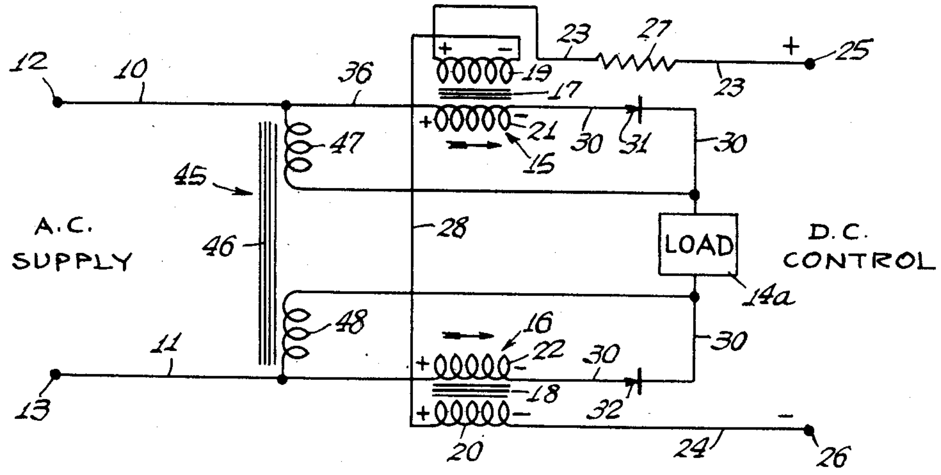
Fig. 3 is a schematic diagram of a magnetic amplifier illustrating still another embodiment of the invention.

Another embodiment of the invention is shown in Fig. 3, and components thereof which are similar to those of Fig. 1 have been given like characters. In Fig. 3 there is no center-tapped autotransformer such as the transformer 35 but instead a special type of autotransformer 45 comprising a core 46 and a pair of windings 47 and 48. The windings 47 and 48 are connected to the supply circuit 10, 11 as shown and also connected to the reactors 15 and 16. The load 14*a* is inserted in the output circuit wire 30, between the rectifiers 31 and 32, and the remaining ends of the transformer coils 47 and 48 are connected to the wire 30 on opposite sides of the load 14*a*. This circuit operates substantially in the same manner as that of Fig. 1, the difference being that the transformer 45 does not have a center-tapped coil but instead comprises two independent coils which are conductively connected to each other only through the medium of the load 14*a*.

Figure 4:
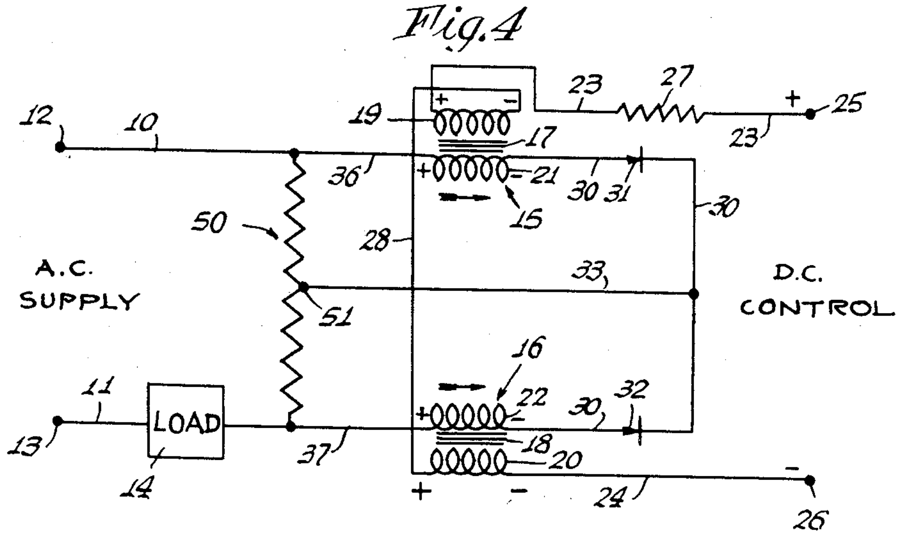
Fig. 4 is a schematic diagram of a magnetic amplifier type of control, illustrating yet another embodiment of the invention.

Another embodiment of the invention is shown in the circuit of Fig. 4. In this circuit a portion of the A.C. power will be evidenced as heat in the coupling means of the control, and if a load separate from said coupling means is employed, this portion of the power may be non-useful. However, the coupling means itself may constitute the load and may be of the type intended to produce heat or light, in which event this power in the coupling means would be useful.

In Fig. 4 components which are similar to those already described above have been given like characters. The difference between the circuits of Figs. 1 and 4 resides in the specific coupling means employed. In Fig. 1 the coupling means comprises the autotransformer 35 whereas in Fig. 4 the coupling means comprises a drop resistor 50 having a tap 51. As shown, the tap 51 is connected to the wire 33 and the ends of the resistor 50 are connected to the wires 10, 11 and 36, 37 as indicated.

In the operation of this circuit, saturation of the reactors 15, 16 will result in alternate loading (short-circuiting or bypassing) of the upper or lower portions of the resistor 50, and the degree of loading or bypass will be controlled by the D.C. potential applied to the terminals 25, 26. Thus the load 14 may be energized to varying degrees, the maximum energization being limited, however, by the existence of the voltage drop across either half of the resistor 50. The current which passes through the resistor 50 will be manifested as heat, and for some applications such heat might be non-useful. However, in the circuit of Fig. 4 the load 14 may be omitted from the supply line 11, or reduced to virtually zero impedance, in which event the coupling means between the A.C. supply circuit and the output coil circuit, comprising the resistor 50 may be constituted as the load. This coupling means may have various forms.

For example, it may comprise two equal-wattage lamps, or it may comprise two banks of lamps, in which event the heat or light, or both, which is evidenced in the coupling means may be useful.

If the drop resistor 50 is constituted of two lamps or two banks of lamps, as for example incandescent lamps, a control of the brilliance of the lamps between certain limits may be readily effected. However, except for the minimum values of load current through such lamps, each lamp or bank of lamps will be energized by 60 pulses or half-waves per second instead of 120 half-waves per second as is now the case in commercial practice, using 60 cycle alternating current. In other words, each lamp or bank of lamps will be energized by a form of halfwave rectified current.

For the condition where the reactors 15, 16 exercise no control, the lamps constituting the resistor 50 will be energized at approximately half voltage, full wave A.C.

All of the above circuits, in accordance with the present invention, are characterized by a substantially symmetrical response characteristic in connection with an A.C. energized load as distinguished from prior types of magnetic amplifier control devices having A.C. energized loads, wherein the response characteristic is essentially asymmetrical.

Variations and modifications may be made within the scope of the claims, and portions of the improvements may be used without others.

I claim:

1. A magnetic amplifier comprising a supply circuit adapted to receive energy from an alternating current source; means providing an electrical load in said A.C. circuit to be energized by alternating current; saturable reactor means having magnetic core structures and output and control windings on said core structures; a control circuit for applying a D.C. potential to said control windings; circuits for said output windings and rectifier means in said circuits, connected in series with the output windings for preventing current flowing through one output winding from flowing into the other; and coupling means connected with said supply circuit and output winding circuits and adapted to exercise a control over the A.C. current through said load, said coupling means providing alternating potentials from the energy of the supply circuit for application to said output winding circuits, and said coupling means further changing the impedance of the supply circuit in response to the coupling means being loaded by changes of the flux in the cores of the reactor means as effected by changes in the current through the control windings whereby adjusting the value of the D.C. current symmetrically varies the value of the impedance and hence the amount of A.M. flowing through the load.

2. The invention as defined in claim 1 in which the coupling means comprises a transformer having a primary connected to the supply circuit and secondary windings connected to the output winding circuits, and in which the reactor means comprises a pair of saturable reactors the output windings of which are connected to said secondary windings.

3. The invention as defined in claim 1 in which the coupling means comprises an autotransformer having a tap connected with said output winding circuits, in which the reactor means includes saturable reactors the output windings of which are connected to the winding terminals of the autotransformer; and in which means are connected between the output windings and the tap for forming a return line for the current flowing through the windings.

4. A magnetic amplifier comprising a supply circuit adapted to receive energy from an alternating current source; means providing an electrical load in said supply circuit to be energized by alternating current; and means having substantially symmetrical response characteristics for changing the amount of electrical energy to the load, said last named means including impedance means in the supply circuit; saturable reactor means having magnetic core structures and output and control windings on said core structures; a control circuit for applying a D.C. current to said control windings; rectifier means; a circuit connecting said output windings and rectifier means for preventing current through one output winding from flowing through the other, and including connections to said impedance means and a common lead which divides the circuit into substantially two symmetrical parts, each part including a portion of the rectifier means, impedance means and output windings whereby adjusting the value of the D.C. current symmetrically varies the value of the impedance and hence the amount of A.C. current flowing through the load.

5. The invention as defined in claim 4 in which the impedance means is an autotransformer having winding end portions connected to the output winding circuit and a tap connected to the return means.

6. The invention as defined in claim 4 in which the impedance means is a transformer having a primary winding connected in the A.C. supply circuit; a secondary winding having end portions connected to the output winding circuit; and a tap on the secondary winding connected to the return means.

7. The invention as defined in claim 4 in which the impedance means is an autotransformer having a pair of windings, one end portion of each winding being connected to the output winding circuit; and the return means comprises a pair of lines, one being connected to each winding at the other end portion thereof.

8. The invention as defined in claim 4 in which the impedance means is a drop resistance having its end portion connected to the output winding circuit and a tap connected to the return means.

9. The invention as defined in claim 1 in which the coupling means comprises a pair of transformer coils having a common core, one of said coils being connected with the supply circuit and the other coil being connected to the output coil circuit; said other coil having a tap intermediate its length; and in which means are connected between the output windings and the tap for forming a return line for the current flowing through the windings.

References Cited in the file of this patent

UNITED STATES PATENTS

| | | |
|---|---|---|
| 2,688,723 | Kadushin et al. | Sept. 7, 1954 |
| 2,711,502 | Alexanderson | June 21, 1955 |
| 2,760,148 | Sakamoto | Aug. 21, 1956 |
| 2,778,987 | Schmidt | Jan. 22, 1957 |
| 2,817,057 | Hollmann | Dec. 17, 1957 |